United States Patent
West et al.

(10) Patent No.: US 7,640,820 B1
(45) Date of Patent: Jan. 5, 2010

(54) BALL SCREW ASSEMBLY AND SPACER ELEMENTS THEREFOR

(75) Inventors: Ryan B. West, Saginaw, MI (US); Bir Inder Singh, Saginaw, MI (US); Stephen R. Ahlers, Saginaw, MI (US); Ryan P. Thomas, Frankenmuth, MI (US); Gwo-Shum Burt Shiu, Saginaw, MI (US)

(73) Assignee: Danaher Motion, Inc., Saginaw, MI (US)

( * ) Notice: Subject to any disclaimer, the term of this patent is extended or adjusted under 35 U.S.C. 154(b) by 604 days.

(21) Appl. No.: 11/271,270

(22) Filed: Nov. 10, 2005

Related U.S. Application Data

(60) Provisional application No. 60/626,778, filed on Nov. 10, 2004.

(51) Int. Cl.
*F16H 1/24* (2006.01)
*F16H 55/02* (2006.01)
*F16C 29/06* (2006.01)
*F16C 19/00* (2006.01)

(52) U.S. Cl. .............. 74/424.82; 74/424.86; 74/424.88; 384/43; 384/50

(58) Field of Classification Search .............. 74/424.82, 74/424.86, 424.87, 424.88; 384/43, 49, 51, 384/520, 521; 473/153
See application file for complete search history.

(56) References Cited

U.S. PATENT DOCUMENTS

| 704,881 | A | * | 7/1902 | Kempshall | ................ | 473/370 |
|---|---|---|---|---|---|---|
| 4,277,117 | A | | 7/1981 | George | | |
| 5,356,227 | A | | 10/1994 | Sibley et al. | | |
| 5,615,955 | A | * | 4/1997 | Namimatsu et al. | ........... | 384/13 |
| 5,927,858 | A | | 7/1999 | Agari | | |
| 6,082,210 | A | | 7/2000 | Ise | | |
| 6,095,009 | A | | 8/2000 | Takagi | | |
| 6,176,149 | B1 | | 1/2001 | Misu | | |
| 6,347,558 | B1 | * | 2/2002 | Miyaguchi et al. | ....... | 74/424.71 |
| 6,415,676 | B1 | | 7/2002 | Takagi et al. | | |
| 6,499,374 | B1 | | 12/2002 | Ohga | | |
| 6,513,978 | B2 | | 2/2003 | Shirai et al. | | |

(Continued)

FOREIGN PATENT DOCUMENTS

DE            4235842            2/2009

OTHER PUBLICATIONS

Low Vision—Braille Dice. http://www.sightconnection.com/plu-370.html. First available Apr. 20, 2001.*

*Primary Examiner*—Thomas R Hannon
*Assistant Examiner*—Justin Krause
(74) *Attorney, Agent, or Firm*—Dickinson Wright, PLLC; John D. Wright

(57) ABSTRACT

A ball screw assembly has an axially extending screw with an external helical groove and a nut with a through bore for receipt of the screw. The through bore has an internal helical groove adapted for cooperation with the external helical groove to define a ball raceway. A plurality of load bearing balls is disposed in the raceway for rolling contact with the internal and external grooves. A spacer is disposed between adjacent ones of the load bearing balls to prevent the balls from contacting one another. Each of the spacers has at least three pairs of diametrically opposite concave dimples adapted for contact with the load bearing balls at separate times from one another.

13 Claims, 4 Drawing Sheets

U.S. PATENT DOCUMENTS

| | | |
|---|---|---|
| 6,561,054 B1 | 5/2003 | Chiu et al. |
| 6,568,858 B2 | 5/2003 | Tanimoto et al. |
| 6,616,335 B2 | 9/2003 | Niwa et al. |
| 6,643,932 B2 | 11/2003 | Takagi et al. |
| 6,644,140 B2 | 11/2003 | Akido |
| 6,742,408 B2 | 6/2004 | Ohkubo et al. |
| 2002/0031285 A1* | 3/2002 | Shirai et al. .................. 384/51 |
| 2002/0088294 A1 | 7/2002 | Miyaguchi et al. |
| 2003/0012464 A1 | 1/2003 | Kuo |
| 2003/0035600 A1 | 2/2003 | Michioka et al. |
| 2003/0061893 A1 | 4/2003 | Miyaguchi et al. |
| 2003/0106386 A1* | 6/2003 | Pacieri et al. ............ 74/424.82 |
| 2003/0221501 A1 | 12/2003 | Ohkubo et al. |
| 2004/0000208 A1 | 1/2004 | Michioka et al. |
| 2004/0123692 A1 | 7/2004 | Ohkubo et al. |

\* cited by examiner

BALL SCREW ASSEMBLY AND SPACER ELEMENTS THEREFOR

REFERENCE TO CO-PENDING APPLICATION

This application claims the benefit of, and incorporates in by reference in its entirety, U.S. Provisional Application Ser. No. 60/626,778, filed Nov. 10, 2004.

BACKGROUND OF THE INVENTION

1. Field of the Invention

This invention relates generally to ball screw assemblies, and more particularly to ball screw assemblies having spacers between load bearing balls.

2. Related Art

Ball screw assemblies are used to effect linear actuation in various industries, such as the machine tool and aerospace fields, for example, wherein improved performance factors, such as, increased speeds, reduced weight, and increased life between servicing, is under constant demand. As such, ball screw assemblies have incorporated ceramic balls between external ball grooves of a screw and internal ball grooves of a nut in attempts to meet ever increasing performance level demands. Though the incorporation of ceramic balls has provided some performance improvements, particularly increased speed capabilities, there remain some challenges in meeting the demands for increased life, increased load carrying capabilities, and reduced noise in use.

SUMMARY OF THE INVENTION

A ball screw assembly has an axially extending screw with an external helical groove and a nut with a through bore for receipt of the screw. The through bore has an internal helical groove adapted for cooperation with the external helical groove to define a ball raceway. A plurality of load bearing balls is disposed in the raceway for rolling contact with the internal and external grooves. A spacer is disposed between adjacent ones of the load bearing balls to prevent the balls from contacting one another. Each of the spacers has at least three pairs of diametrically opposite concave dimples, such that each of the pair of dimples is adapted for contact with the load bearing balls at separate times from one another.

BRIEF DESCRIPTION OF THE DRAWINGS

Some of the objects, features and advantages will become readily apparent in view of the following detailed description of presently preferred embodiments and best mode, appended claims, and accompanying drawings, in which:

DETAILED DESCRIPTION OF PREFERRED EMBODIMENTS

Figure 1:
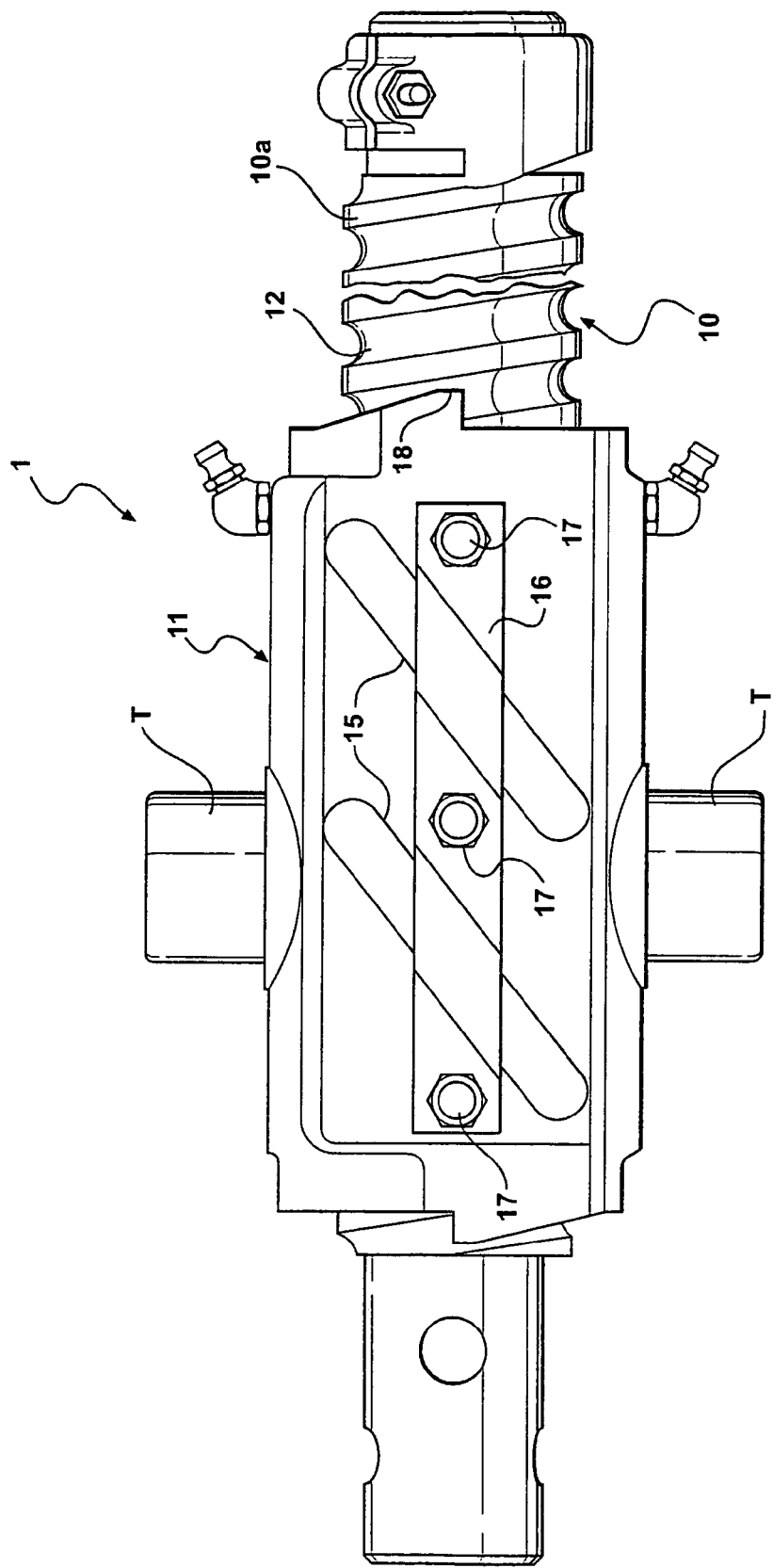
FIG. 1 is an elevation view of a ball nut and screw assembly according to one presently preferred embodiment which employs a plurality of load bearing balls and spacers.
Figure 2:
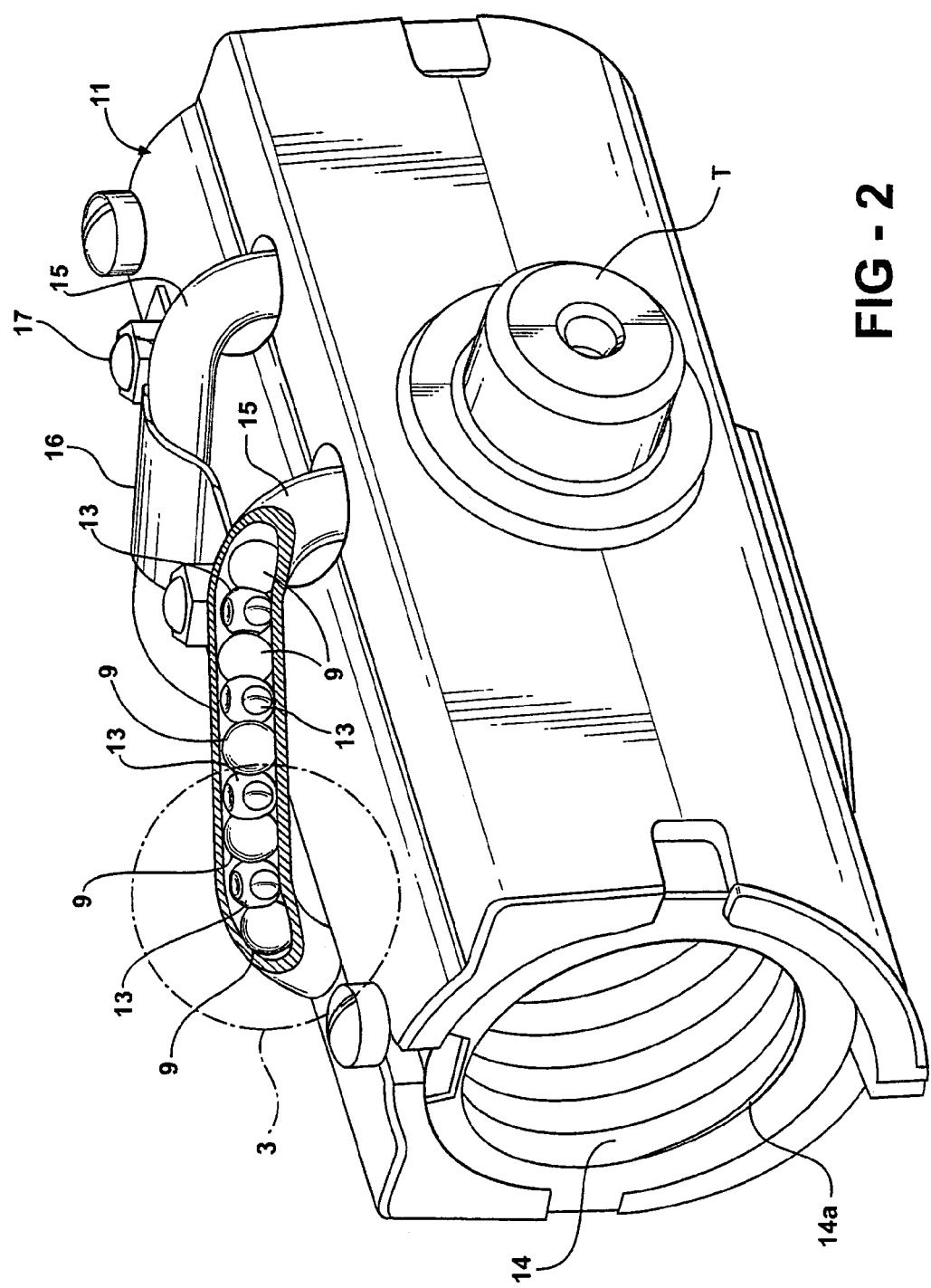
FIG. 2 is a partially broken away perspective view of the ball nut of FIG. 1 showing at least some of the balls and spacers.
Figure 3:
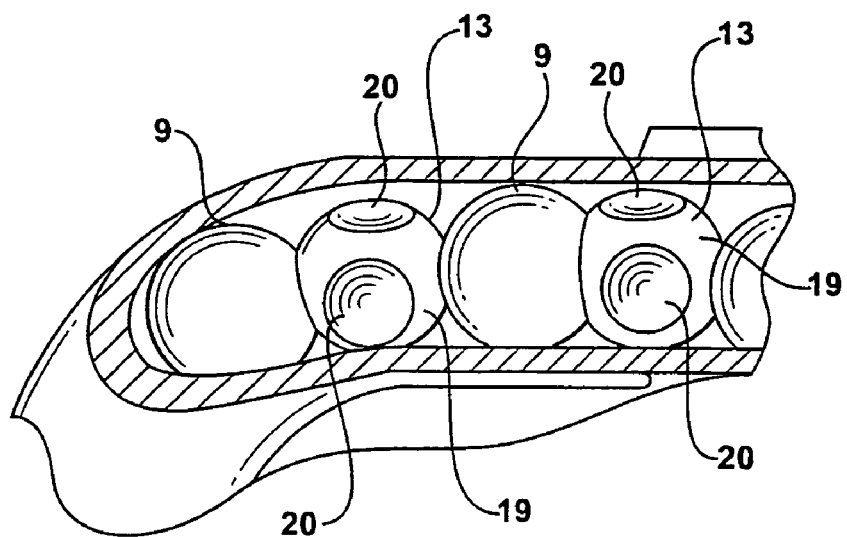
FIG. 3 is an enlarged partially broken away perspective view of the encircled area numbered 3 of FIG. 2.
Figure 4:
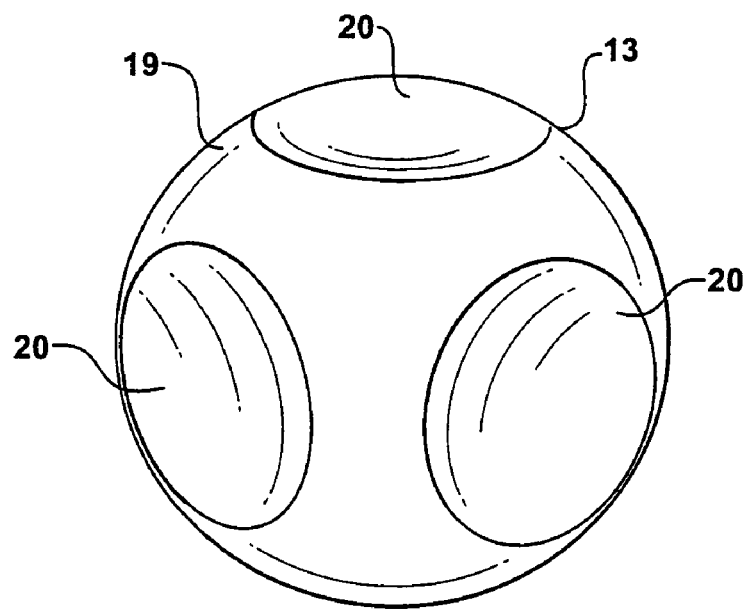
FIG. 4 is an enlarged perspective view according to one presently preferred embodiment of one of the spacers.

Referring now in more detail to the drawings, FIG. 1 illustrates a ball nut and screw assembly 1, such as that disclosed in U.S. Pat. No. 4,905,533 to Benton et al., which is owned by the applicant's assignee, and is incorporated herein by reference in its entirety. The assembly has a screw, generally designated 10, assembled with a ball nut, generally designated 11. The screw 10 has a continuous external helical thread defining a land 10a, and a continuous external helical groove 12 of generally semi-circular or Gothic arch form in cross section. As shown in FIG. 2, the ball nut 11 has a mating internal helical groove 14 adapted for cooperation with external helical groove 12 of the screw 10 to facilitate translation of the nut 11 relative to the screw 10. Generally, a raceway is defined between the groove 12 of the screw 10 and the groove 14 of the nut 11 for receipt of a plurality of load bearing balls 9 (FIGS. 2 and 3), which engage and roll relative to the grooves 12, 14 to permit relative rotation and translation of the nut 11 and screw 10 with relatively low frictional impedance. A plurality of self-aligning spacer elements, referred to as spacers 13 hereafter, are preferably disposed between adjacent load carrying balls 9 to prevent the balls 9 from coming into frictional contact with one another, thereby reducing the potential for galling frictional wear of the balls 9. The internal helical groove 14 of the ball nut 11 is bounded by an internal helical land or thread 14a, and conventional external ball returns 15 (FIGS. 1 and 2) span a number of turns of the helical grooves 12, 14 and communicate with the grooves 12, 14 to provide ball recirculation. A clamp plate 16, secured by fasteners 17, may be provided to secure the ball return tubes 15 in position. Though the ball returns 15 are shown, by way of example, as being an external type, it should be recognized that internal or end returns can be used. Trunnions T, by way of example and without limitation, can be provided on the nut 11 to facilitate mounting the ball screw and nut assembly 1 in position.

Figure 6:
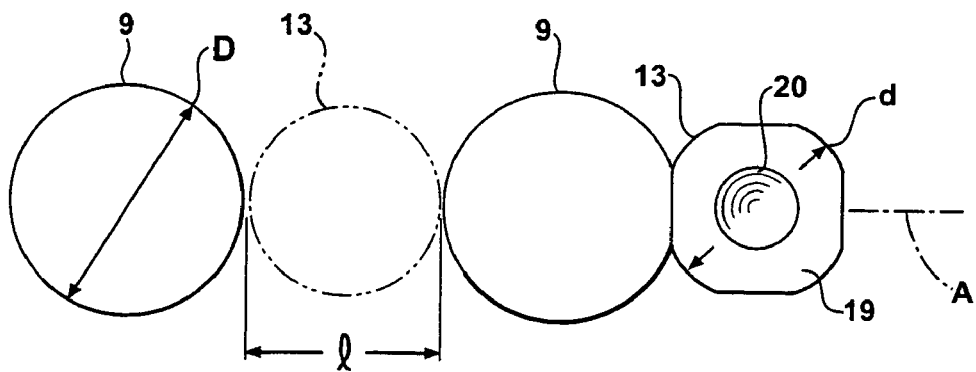
FIG. 6 is a partial schematic side view showing lash within a circuit of the balls and spacers.

As shown in FIG. 6, the load bearing balls 9 are spherical with a predetermined radius of curvature having a diameter D, wherein the diameter D is determined largely by the load capacity and speed requirements demanded in the intended application. To facilitate achieving a desired D*n value, generally between 200,000 and 350,000, (known as the product of the on-center diameter across load carrying balls multiplied by the relative rpm between the screw 10 and nut 11), the load bearing balls 9 are preferably formed, such as, by way of example and without limitation, by being molded, from a relatively hard, high temperature, low density ceramic material, such as silicon nitride ($Si_3N_4$), for example. It should be recognized that other ceramic materials, such as alumina oxide, ruby sapphire and zirconia, by way of examples without limitation, are contemplated to be available and suitable for use.

The spacers 13 are formed having a spherical outer surface (FIGS. 3-6) with a diameter (d) (FIG. 6) that can be equal to the diameter D of the balls 9, however, is preferably less than the diameter D of the balls by approximately 0.002-0.003". As such, the spacers 13 are generally assured of not being placed under load across the grooves 12, 14 in use. The spacers 13 are preferably constructed from a hard, relatively slippery or low friction, polymeric material having a relatively high resistance to heat, which is more elastic or yieldable than the balls 9, such as Nylon, Teflon®, or polyamide-imide (Torlon®), by way of examples and without limitation.

Figure 5:
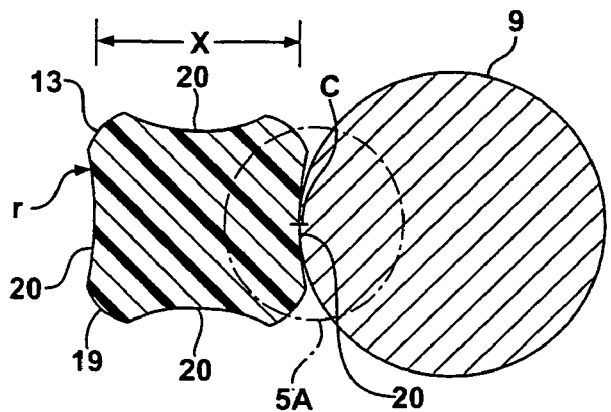
FIG. 5 is a cross sectional side view illustrating one of the balls engaged in point contact with one of the spacers.
Figure 5A:
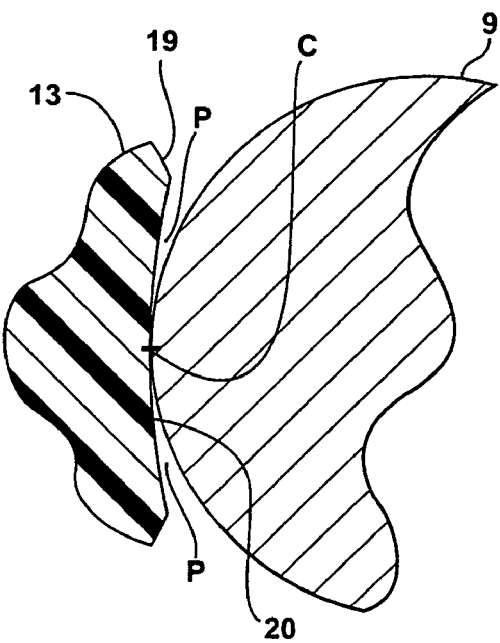
FIG. 5A is an enlarged view of the encircled area 5A of FIG. 5.

To facilitate self-alignment of the spacers 13 relative to the balls 9, the spacers 13 preferably have at least six concave surfaces, referred to hereafter as dimples 20, extending radially inwardly from their outer surfaces 19. The dimples 20 are arranged relative to one another about the circumference of the spacer 13 so that each dimple 20 is diametrically opposite another dimple 20 to define opposite pairs of working surfaces. It should be recognized that more dimples may be formed, in even numbers, such as eight or ten, for example. The dimples 20 have a concavity with a radius (r) (FIG. 5) that is at least slightly greater than the radius of curvature of the load bearing balls 9, and therefore, is also greater than the radius of the spacer diameter (d). As such, each ball 9 impacts an adjacent spacer dimple 20 so that the curvature of the ball 9 is in non-conforming contact with the curvature of the dimple 20, wherein a point contact, generally designated at contact point (C), is established, thereby significantly reducing the rolling friction between the balls 9 and the spacers 13. In addition, annular pockets (P) (FIG. 5A) are generally formed by the non-conforming relative curvatures between the concave surfaces 20 of the spacers 13 and the balls 9 to facilitate retaining lubrication within the pockets P between the balls 9 and spacers 13.

The balls 9 and spacers 13 are preferably loaded in alternating sequence and in numbers to define a closed loop circuit with a predetermined and desirable amount of potential spacing, referred to hereafter as lash, throughout the circuit of balls 9 and spacers 13. Initially, upon loading the balls 9 and spacers 13, the total amount of lash within the string of balls 9 and spacers 13 is preferably less than the maximum diameter (d) of the spacers 13, thereby, preferably preventing the engaged dimples 20 of the spacers 13 from rotating out of engagement with the respective adjacent balls 9 during initial use. Accordingly, the spacers 13 remain in a self-aligned arrangement relative to the balls 9, as initially loaded and during initial use. It should be recognized that while loading the balls 9 and spacers 13, the spacers automatically rotate so that one pair of dimples 20 becomes self-aligned with the load bearing balls 9 to establish the desired amount of lash within the assembly 1. When the proper alignment has been achieved, the spacers 13 are preferably out of contact with the grooves 12, 14 such that a gap is defined between the spacers 13 and grooves 12, 14. Accordingly, the spacers 13 are generally not under load across the grooves 12, 14 in use.

In use, upon the built-in lash increasing over time, such as occurs through wearing of the balls 9 and/or dimples 20 engaged with the load bearing balls 9, the total lash within the circuit eventually increases. As illustrated in FIG. 6, the total lash (l) eventually becomes substantially equal to or slightly greater than the diameter (d) of the spacers 13. As such, one or more of the spacers 13 is permitted to rotate about an axis other than an axis (A) (FIG. 6) about which the balls 9 and spacers 13 are generally aligned, thereby allowing the initially engaged dimples 20 to rotate out of engagement with the adjacent balls 9 to bring a different pair of diametrically opposite dimples 20 into aligned abutting engagement with the adjacent balls 9. As such, though the total lash (l) within the ball screw assembly 1 inherently increases over time, the ability of the spacers 13 to rotate different pairs of diametrically opposite dimples 20 into and out of engagement with adjacent load bearing balls 9 allows for at least some of the increase in lash to be removed. As such, the spacers 13, while preventing the balls 9 from contacting one another, also act to control and limit the amount of lash within the assembly 1 by rotating pairs of less worn dimples 20 into self aligned engagement with the balls 9. Stated another way, a generally constant amount of built-in lash within the ball screw assembly 1 can be achieved by maintaining a generally constant minimum diametrical distance (X) (FIG. 5) across valleys of the opposite contact points (C) of the spacers 13 in use. Therefore, as the distance (X) begins to decrease across one set of increasingly worn diametrically opposite dimples 20, a new or less worn set of dimples 20 having a greater distance (X) is rotated into aligned engagement with the balls 9.

It should be recognized that upon reading the disclosure herein, one ordinarily skilled in the art of ball screw assemblies would readily recognize other embodiments of ball screw assemblies and spacers than those disclosed herein, with those embodiments being within the spirit and scope of the invention. The scope of the invention is defined by the following claims.

We claim:

1. A ball screw assembly comprising:
   an axially extending screw having an external helical groove;
   a nut having a through bore for receipt of said screw, said through bore having an internal helical groove adapted for cooperation with said external helical groove to define a ball raceway;
   a plurality of balls disposed in said ball raceway for load bearing rolling contact with said internal and external grooves; and
   a spacer disposed between adjacent ones of said load bearing balls to prevent said balls from contacting one another, each of said spacers having at least three pairs of diametrically opposite concave surfaces, each of said pair of concave surfaces being adapted for contact with said balls at separate times from one another.

2. The ball screw assembly of claim 1 wherein said balls have a predetermined radius and said concave surfaces have a radius of curvature greater than the radius of said balls to establish non-conforming contact between said pairs of concave surfaces and said balls.

3. The ball screw assembly of claim 2 wherein a gap is defined between said spacers and said external and internal helical grooves while one pair of said concave surfaces is in contact with said balls.

4. The ball screw assembly of claim 1 wherein said spacers are rotatable to bring different pairs of said concave surfaces into contact with said balls.

5. The ball screw assembly of claim 1 wherein said balls have a predetermined diameter and said spacers have a diameter less than said diameter of said balls.

6. The ball screw assembly of claim 1 wherein said balls and said spacers are loaded in alternating sequence to form a closed loop circuit having a predetermined amount of lash, said spacers having an outer diameter and said lash being initially less than said outer diameter to initially prevent one pair of diametrically opposite concave surfaces on each of said spacers from rotating out of contact from abutting ones of said balls.

7. The ball screw assembly of claim 6 wherein said lash increases during use to an amount that is greater than said diameter of said spacers to allow at least one pair of said diametrically opposite concave surfaces to rotate out of contact with said balls to bring another one of said pairs of concave surfaces into engagement with said balls.

8. A ball screw assembly comprising:
   an axially extending screw having an external helical groove;

a nut having a through bore sized for receipt of said screw and having an internal helical groove adapted for cooperation with said external helical groove to form a ball raceway;

a plurality of load bearing balls disposed in said ball raceway; and a spacer disposed between at least one pair of adjacent load bearing balls to prevent the adjacent balls from contacting one another, said spacer having at least six concave surfaces adapted for contact with said adjacent balls, said spacers being rotatable to bring different ones of said concave surfaces into engagement with said balls.

9. The ball screw assembly of claim 8 wherein each one of said concave surfaces is diametrically opposite another one of said concave surfaces.

10. The ball screw assembly of claim 8 wherein said balls have an outer surface with a radius of curvature and said concave surfaces have a radius of curvature greater than the outer surface radius of curvature to establish nonconforming contact between said concave surfaces and said outer surface of said balls.

11. The ball screw assembly of claim 10 wherein annular pockets are defined between concave surfaces abutting said balls and said outer surface of said balls.

12. The ball screw assembly of claim 8 wherein said balls have an outer surface with an outer diameter and said spacers have an outer surface with an outer diameter less than said outer diameter of said balls.

13. The ball screw assembly of claim 12 wherein gaps are defined between the outer surface of said spacers and said internal and external grooves when diametrically opposite concave surfaces are contacting adjacent balls.

\* \* \* \* \*